United States Patent [19]
Murata et al.

[11] Patent Number: 4,880,579
[45] Date of Patent: Nov. 14, 1989

[54] METHOD FOR CLOSING OPENINGS OF THROUGH-HOLES IN A PIPE WALL

[75] Inventors: Masahiro Murata, Youkaichi; Kaoru Takahashi, Ohtsu, both of Japan

[73] Assignee: Sekisui Kagaku Kogyo Kabushiki Kaisha, Osaku, Japan

[21] Appl. No.: 159,436

[22] Filed: Feb. 18, 1988

Related U.S. Application Data

[63] Continuation of Ser. No. 910,473, Sep. 23, 1986, abandoned.

[51] Int. Cl.$^4$ .................. B29C 57/00; B29C 57/04
[52] U.S. Cl. .................. 264/26; 264/322; 425/DIG. 218; 425/174.8 R
[58] Field of Search .................. 264/23, 25, 26, 320, 264/322; 425/174.6, 393, DIG. 218, 174.8

[56] References Cited

U.S. PATENT DOCUMENTS

| | | | |
|---|---|---|---|
| 4,140,461 | 2/1979 | Wiley et al. | 425/174.6 |
| 4,338,716 | 7/1982 | Marissen et al. | 264/322 |
| 4,390,383 | 6/1983 | van Dongeren . | |

FOREIGN PATENT DOCUMENTS

| | | | |
|---|---|---|---|
| 90753/82 | 5/1984 | Australia . | |
| 13458 | 7/1980 | European Pat. Off. . | |
| 52017 | 5/1982 | European Pat. Off. . | |
| 107096 | 5/1984 | European Pat. Off. . | |
| 801041 | 12/1950 | Fed. Rep. of Germany . | |
| 1928843 | 6/1969 | Fed. Rep. of Germany . | |
| 2065390 | 6/1973 | Fed. Rep. of Germany . | |
| 2830088 | 1/1980 | Fed. Rep. of Germany . | |
| 1036848 | 9/1953 | France . | |
| 1047013 | 12/1953 | France . | |
| 1077474 | 11/1954 | France . | |
| 1352637 | 1/1964 | France . | |
| 2146121 | 3/1973 | France . | |
| 267 | 1/1978 | Japan | 264/322 |
| 27715 | 2/1982 | Japan | 264/322 |
| 57-178824 | 11/1982 | Japan . | |
| 57-185112 | 11/1982 | Japan . | |
| 59-127719 | 7/1984 | Japan . | |
| 60-115429 | 6/1985 | Japan . | |
| 60-168627 | 9/1985 | Japan . | |
| 639997 | 7/1950 | United Kingdom | 264/322 |
| 2160144 | 12/1985 | United Kingdom . | |

*Primary Examiner*—James Lowe
*Attorney, Agent, or Firm*—Spencer & Frank

[57] ABSTRACT

A method for closing the opening of each of the through-holes in the pipe-wall of a resin pipe and which extend parallel to the axis of the pipe, the method comprises pressing one end portion of the pipe in the direction parallel to the axis in a mold for closing the opening, the mold being connected to a high frequency current source, and heating the end portion by applying a high frequency current to the mold so as to melt the hole-partition walls which partition the through-holes, and the inner surface of the through-holes, thereby closing the opening.

5 Claims, 6 Drawing Sheets

METHOD FOR CLOSING OPENINGS OF THROUGH-HOLES IN A PIPE WALL

This application is a continuation of application Ser. No. 06/910,473, filed Sept. 23, 1986 and now abandoned.

BACKGROUND OF THE INVENTION

1. Field of the invention:

This invention relates to a method for closing the opening of each of the through-holes formed in the pipe-wall of a resin pipe and extending parallel to the axis of said pipe.

Figure 1:
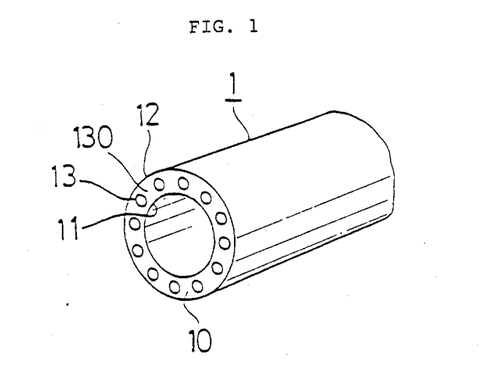
FIG. 1 is a fragmentary perspective view showing an example of a resin pipe having through-holes to be closed in accordance with the method of this invention.

2. Description of the prior art:

In order to reduce the weight of a pipe and the amount of materials used in a pipe, and to provide a pipe with improved strength against a flattening load so as to minimize deformation due to stress caused by an earth load, etc., attempts have been made by forming a multiplicity of axially extending through-holes 13 in spaced parallel relation in the pipe-wall of a resin pipe, for example, as shown in FIG. 1. Such a resin pipe 1 is used for buried sewage piping, etc., since it has considerably high flattening rigidity characteristics. The usual method for connecting such resin pipes 1 is to insert a diametrically enlarged end (socket side) of a pipe into a diametrically nonenlarged end (spigot side) of another pipe, and then to join the pipes together by applying an adhesive or by attaching a seal ring. However, such method has a disadvantage in that the through-holes 13 formed in the pipe-wall of the pipe communicate with various parts within and/or outside of the piping, whereby fluid leakage from the piping or inflow of underground water into the piping may occur. Accordingly, such pipes cannot be used as is. It is necessary to close the through-holes 13 on the socket side or spigot side after extrusion molding or secondary processing of the pipe.

Figure 10:
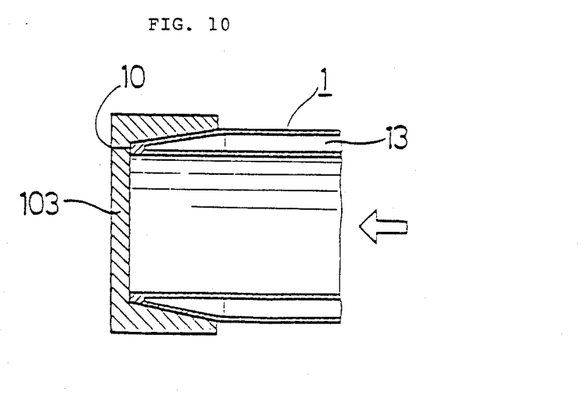
FIGS. 10, 11(a) and 11(b) are front sectional views illustrating prior art methods.

In Japanese Published Examined Patent Application No. 57-44111, as FIGS. 1 and 10 illustrate, it was proposed to place a heated pipe end 10 in a mold 103, then press the pipe end 10 against the mold 103 while rotating the mold 103, whereby the hole-partition walls 130 are twisted. By twisting the pipe end 10 in this way, the inner and outer walls 11, 12 thereof are pressed together, thereby closing the through-holes 13. However, the portion subjected to such treatment exhibits contractions formed on the inner wall 11 and/or the outer wall 12, which may lead to the development of some structural defects and thus to a breakage of the pipe. Further, the through-holes cannot be completely closed by the proposed method, because the closing is performed only by contact bonding which is caused by deforming or crushing the pipe-wall. In addition, the operation required for rotating the mold 103 is very complicated.

Figure 11:
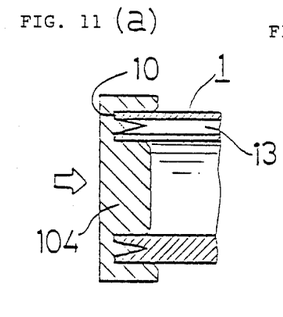

In Japanese Published Unexamined Patent Application No. 54-103480 there is disclosed a method in which, as FIGS. 1 and 11(a) and (b) illustrate, hole-partition walls 130 of the pipe end 10 are broken by a cutting tool 104 while the pipe end is heated. Then the inner and outer walls 11, 12 are pressed by a pressing mold 105 to be contact-bonded together. However, in this method, the adhesion of the crushed portions is not satisfactory. This method also involves a number of stages and is complicated.

In both of the above two methods, the through-holes 13 are merely crushed by pressing. This involves a high possibility that the once-closed portion may be re-opened when the pipe is subjected to secondary processing such as diametrical enlargement, after closing of the through-holes, or when any shock such as dropping, or any property change with time occurs. Also, in the case of resin pipes made of polyvinyl chloride, which has a melting temperature and a decomposition temperature in close proximity to each other, are to be connected with each other, the heating temperature and heating time must be strictly controlled, and, therefore, the operation is very complicated.

Besides the above mentioned methods, there is a known method in which a caulking material such as a silicone resin, is injected into the through-holes 13 to plug or close them. However, the injection of such caulking material into individual through-holes is quite troublesome. Such a method of closing the holes naturally involves variations in sealing performance among the through-holes. Furthermore, the silicone resin and polyvinyl chloride are incompatible with each other. Therefore, this third method does not assure a satisfactory closing effect.

It has been also proposed to attach a blind plate made of a resilient material to the wall-end of the resin pipe 1. However, such a blind plate may be easily detached from the end by applying only a small force. Therefore, this method is not a satisfactory one.

SUMMARY OF THE INVENTION

Most molecules in an electrically low conductive material (i.e., a dielectric material) have self-contained positive and negative charges of equivalent amounts, and each individual molecule thus forms an electric dipole. Therefore, if a dielectric material is introduced into a high-frequency field, an individual molecule in the dielectric material begins to rotationally oscillate under the high-frequency field, and dielectric loss is caused through the friction between adjacent molecules to generate heat. This exothermic phenomenon occurs in every portion of the dielectric material, with a result of a temperature rise in the material. In this conjunction, the energy loss developed in the dielectric material is given by the consumed electric energy P as the following equation (1) indicates:

$$P = kfE^2 \epsilon \tan \delta \tag{1}$$

where, f represents the frequency (Hz), E represents the field strength (V/cm), $\epsilon$ represents the dielectric constant (F/cm), $\tan \delta$ represents the dielectric dissipation factor, and k represents the constant of proportion.

Between the dielectric dissipation factor $\tan \delta$ and the power loss factor (dielectric power factor) $\cos \phi$ consumed as thermal energy when an AC voltage is applied, a relationship exists which can be expressed by the following equation (2):

$$\tan \delta = \cos \phi \sqrt{1 - \cos^2 \phi} \tag{2}$$

In the case of a plastic material, $\delta$ is generally small (i.e., $\phi$ is about 90°), hence, $\tan \delta \approx \cos \phi$, in other words, the dielectric dissipation factor $\tan \delta$ is approximately equal to the dielectric power factor $\cos \phi$. Therefore, if the frequency f and the field strength E are fixed, the electric energy P (value of the generated heat) depends on the product (dissipation factor) of the dielectric constant $\epsilon$ and the dielectric power factor $\cos$ φ(or dielectric dissipation factor tan δ). The greater the value of the dissipation factor, the greater the value of the generated heat becomes.

High frequency dielectric heating is a technique utilizing this exothermic phenomenon of a dielectric material in a high-frequency field. Unlike other heating methods, it is of an internal heating method, and has the following characteristic features: (1) uniform heating of the object to be heated including the interior thereof is possible; (2) heating it as high rate as possible, with ease of temperature control; (3) any particular portion of the object can be selectively heated; and (4) high heating efficiency can be achieved.

The present invention is based on a novel idea that the theory of high-frequency dielectric heating may be utilized for closing the opening of each of the through-holes formed in the pipe-wall of a resin pipe and which extend parallel to the axis of said pipe.

The method of this invention, which overcomes the above-discussed and numerous other disadvantages and deficiencies of the prior art, is a method for closing the opening of each of the through-holes formed in the pipe-wall of a resin pipe and extending parallel to the axis of said pipe by pressing one end portion of the pipe in the direction parallel to the axis in a mold for closing the opening. The mold is connected to a high frequency current source, and the end portion is heated by applying a high frequency current to the mold so as to melt the hole-partition walls which partition the through-holes, and the inner surface of the through-holes, thereby closing the opening.

In a preferred embodiment, the mold for closing the opening includes inner and outer molds disposed coaxially with the resin pipe for holding the inner and outer walls of the pipe therebetween, and a closure wall for closing the innermost end of a space for housing the end portion, the space being defined by the inner and outer molds. The inner mold is of a columnar shape and the outer mold is of a cylindrical shape. The inner and outer molds can have radially sloped surfaces adapted to allow the inner and outer walls of the end portion to be brought closer to each other or can have radially sloped surfaces adapted to allow the end portion to be diametrically enlarged or reduced.

In a preferred embodiment, the inner and outer molds are made of an electrode material having high electroconductivity. The inner and outer molds are, also, preferably connected to the high-frequency oscillator.

In a preferred embodiment, the inner mold is a mold for forming a sleeve-type socket which has a larger diameter than the inner diameter of the resin pipe. The mold for forming the socket preferably has a fluid circulaton tube for temperature regulation.

In a preferred embodiment, the closure wall is made of a material having insulating properties, a low dielectric constant, a low dielectric power factor, and good heat resistance.

The method of this invention further comprises heating and softening one end portion and/or a portion adjacent thereto of the pipe before pressing the end portion into a mold for closing said opening.

In a preferred embodiment, the mold for closing the opening includes inner and outer molds disposed coaxially with said resin pipe for holding the inner and outer walls of the pipe therebetween, and a closure wall for closing the innermost end of a space, for housing said end portion, said space being defined by said inner and outer molds.

In a preferred embodiment, the heating and softening operation is carried out by employing a mold for bringing the inner and outer walls of the end portion closer to each other. The inner mold is of a columnar shape and the outer mold is of a cylindrical shape. The inner and outer molds can have radially sloped surfaces adapted to allow the inner and outer walls of said end portion to be brought closer to each other or can have radially sloped surfaces adapted to allow the end portion to be diametrically enlarged or reduced. In a preferred embodiment, the inner and outer molds are made of an electrode material having high electroconductivity. The inner and outer molds are, preferably, connected to said high-frequency oscillator.

In a preferred embodiment, the inner mold is a mold for forming a sleeve-type socket which has a larger diameter than the inner diameter of said resin pipe. The mold for forming a socket has a fluid circulation tube for temperature regulation.

In a preferred embodiment, the closure wall is made of a material having insulating properties, a low dielectric constant, a low dielectric power factor, and good heat resistance.

In a preferred embodiment, the resin pipe is made of rigid polyvinyl chloride.

Figure 2:
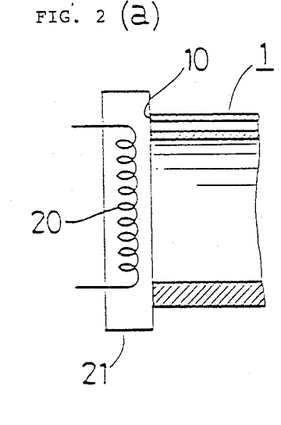
FIGS. 2(a) and 2(b) are sectional front views showing, by way of example, a heating plate and a heating oven respectively for preheating a resinpipe.

A resin pipe to which the present invention is applied has a plurality of through-holes formed in the wall thereof and which extend parallel to the axis of the pipe, as illustrated in FIG. 1. A thermoplastic resin having a large dissipation factor can be advantageously used as the material for such a resin pipe. Examples of such resin include rigid or non-rigid polyvinyl chloride, polyamide, and methacrylate. Among them, non-rigid polyvinyl chloride is preferred because its dielectric power factor rapidly increases with a rise in temperature, and therefore it melts or softens at relatively low temperatures. Further, when the resin pipe is made of non-rigid polyvinyl chloride, through-holes 13 of the pipe end portion 10 can be readily closed without subjecting the pipe end portion 10 to any particular preheating or presoftening. On the other hand, a resin pipe 1 made of rigid polyvinyl chloride, which has a lower dielectric power factor than nonrigid polyvinyl chloride, does not melt or soften until the temperature becomes close to its melting temperature. Therefore, if the end portion of the resin pipe 1 is directly subjected to high-frequency dielectric heating, thermal stress may be concentrated on a portion having a smaller sectional area such as a hole-partition wall 130, and such portion is thus subject to scorching and/or decomposition. If the resin pipe 1 is made of rigid polyvinyl chloride, it is desirable that, as illustrated in FIGS. 2(a) and 2(b) that end portion 10 or a portion adjacent thereto of the resin pipe 1 is preheated uniformly by a hot plate 21 or by a heating oven 22 having a heater 20. Through such preheating it is possible to provide an improved dielectric power factor (i.e., greater dissipation factor) and thus to perform high-frequency dielectric heating effectively. The preheating temperature depends on factors such as the material and configuration of the resin pipe 1. For example, with a resin pipe 1 made of rigid polyvinyl chloride, the preheating temperature may be suitably set within the range of 100° to 150 ° C.

Thus, the invention described herein makes possible the following objects: (1) to provide a method for closing the opening of each of the through-holes formed in the pipe-wall of a resin pipe and extending parallel to the axis of said pipe which can completely close the opening of the through-hole, uniformly and instantaneously without decomposing the resin; (2) to provide a method for closing the opening of through-holes of a resin pipe which can assure the closing performance of the closed portion for a long period of time regardless of secondary processing, such as diametrical enlargement, or stress such as impact or repeated flattening compressive loads; (3) to provide a method for closing the opening of through-holes of a resin pipe which can be very easily and economically performed; (4) to provide a method for closing the opening of through-holes of a resin pipe which can diametrically enlarge an end portion of the pipe concurrently with closing the opening, thereby improving the economical efficiency; (5) to provide a method for closing the opening of through-holes of a resin pipe in which the high-frequency dielectric heating is employed to heat internally the resin pipe, thereby preventing the resin from adhering to the surface of a mold; (6) to provide a method for closing the opening of through-holes of a resin pipe in which the closing can be completed in a short period of time to avoid the decomposition of the resin.

BRIEF DESCRIPTION OF THE DRAWINGS

This invention may be better understood and its numerous objects and advantages will become apparent to those skilled in the art by reference to the accompanying drawings as follows.

DESCRIPTION OF THIS PREFERRED EMBODIMENTS

Example 1

Figure 3:
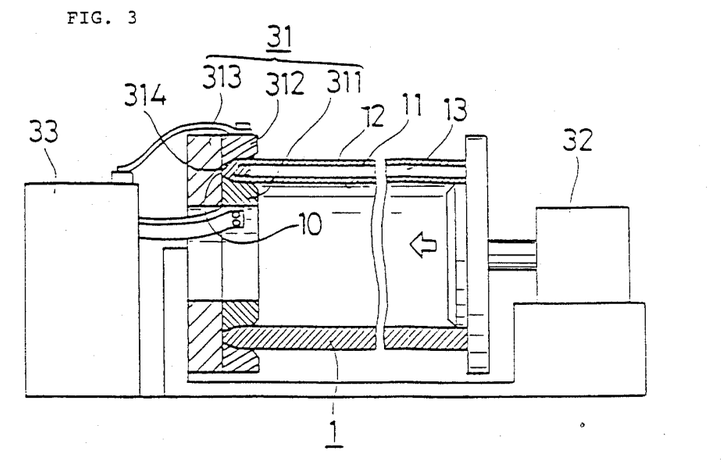
FIG. 3 is a sectional view in front elevation showing one example of an apparatus for practicing the method of the invention.

An example of an apparatus for closing the opening of through-holes of a resin pipe which is employed in practicing the method of the present invention includes, as illustrated in FIG. 3, a mold 31 for closing the opening of through-holes, a pressing device 32 for pressing an end portion 10 of a resin pipe 1 against the mold 31, and a high-frequency oscillator 33 connected to the mold 31.

Figure 4:
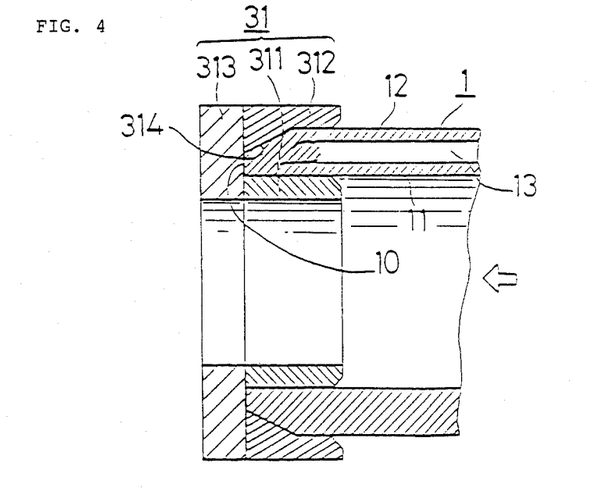
FIGS. 4, 5 and 6 are front sectional views showing other examples of such apparatus.

The mold 31 includes an inner mold 311 and an outer mold 312 which are of a ring shape disposed coaxially with the resin pipe 1, and a closure wall 313 for closing the innermost end of a space 314 which houses the end portion of a resin pipe and is defined by the inner mold 311 and outer mold 312. The inner mold 311 and the outer mold 312 respectively have radially sloped surfaces along which an inner wall 11 and an outer wall 12 of the end portion 10 of the pipe 1 may be smoothly guided into the housing space 314. If the radially sloped surface of the outer mold 312 is more sharply angled, as FIG. 4 shows, the resulting outer surface of the resin pipe 1 in the vicinity of the front end thereof may be tapered. Thus, when the so formed closed pipe is connected to another pipe, its spigot end can be smoothly inserted into the socket of the latter. Both the inner mold 311 and the outer mold 312 are made of an electrode material having high electric conductivity such as brass or copper, and are connected to a high frequency oscillator 33 through copper bars. The closure wall 313 closes the innermost end of the space 314 for housing the pipe end 10 and electrically insulates the inner mold 311 from the outer mold 312. Such closure wall 313, therefore, is made of suitably selected a material having a low dielectric constant and a low dielectric power factor (i.e., low loss factor), and excellent heat resistance. Examples of such material include polytetrafluoroethylene (tradename: Teflon) and polyacetal (tradename: Duracon). The mold 31 is fixed to a suitable fixed member.

The pressing device 32 can press the resin pipe 1 against the mold 31 in the direction parallel to the axis of the pipe. For example, a hydraulic or pneumatic cylinder may be advantageously employed as the pressing device 32. The pressing force of the pressing device 32 may be suitably preset according to the material, configuration, and size of the resin pipe 1, and also to the capability of the high-frequency oscillator 33. The high-frequency oscillator 33 may be of any known type. The frequency and field strength of and the application time for the high frequency current to be used may be suitably selected by considering such factors as the material, configuration and size of the resin pipe 1, and electrode spacing (the distance between the inner and outer molds 311, 312).

The above described apparatus for closing the opening of through-holes functions as follows. When closing the through-holes 13 of a resin pipe 1 made of a rigid vinyl chloride and having a wall thickness of about 10 mm, for example, the end portion 10 and/or a portion adjacent thereto of the resin pipe 1 is heated and softened in advance by a heating plate 21 as shown in FIG. 2(a), or by a heating oven 22 as shown in FIG. 2(b). Then, the end portion 10 of the resin pipe 1 is axially inserted into the housing space 314 and pressed by the pressing device 32. Where the resin pipe 1 is made of non-rigid vinyl chloride, the pipe end 10 is inserted into the mold 31 without being preheated. Concurrently with or immediately after the insertion of the resin pipe 1 into the mold 31, a high-frequency current of 40 MHz, for example, is applied to the inner and outer molds 311, 312 of the mold 31 with a power output of 3 kW. The application time of the current is suitably set within the range of 5 to 30 sec. The resin pipe 1 is continuously pressed by the pressing device 32 while being melted and softened by the high-frequency current applied to the mold 31. The pressing force is set to be more than 2 kg/cm$^2$ of the sectional area of the pipe end portion 10, or preferably it is set within the range of 2 to 6 kg/cm$^2$. If the pressing force is relatively small (i.e., in the vicinity of 2 kg/cm$^2$), the pipe end portion 10 advances into the housing space 314 chiefly through selective melting or softening of hole-partition walls 130 by the high-frequency dielectric heating. If the pressing force is relatively large (i.e., in the vicinity of 6 kg/cm$^2$), the walls 130 and the inner wall of the through-holes 13 are crushed mainly under this pressing force, and accordingly the pipe end portion 10 advances into the housing space 314, in which the portion is subjected to melting or softening by high-frequency dielectric heating. The wall portions of the pipe located adjacent to the inner and outer molds 311, 312 are maintained at a relatively low temperature, since the inner and outer molds 311, 312 are made of a metallic material having good thermal conductivity.

Through melting of hole-partition walls 130 and inner walls of the through-holes 13, the inner and outer walls 11, 12 of the resin pipe end are fused and firmly bonded together while they are inwardly guided in the housing space 314 along the sloped surfaces of the inner and outer molds 311, 312. At this stage, surplus molten resin fills the inner space of the through-holes 13 as it is pushed. A part of the surplus molten resin flows into a gap between the front pipe end and the mold 31. This leads to an increase of the fused and bonded area in the pipe end portion 10, and thereby the sealing effect can be improved.

In the prior art methods for closing the opening of through-holes, the step of heating-melting and the step of pressing are carried out separately. Therefore, the once-melted resin becomes cooled before the step of pressing is begun. As a result, satisfactory fusion bond cannot be achieved by the conventional methods. In contrast, the method of this invention is such that heating-melting and pressing and fusion bonding are carried out substantially concurrently; therefore, even when resin material which has a melting temperature and a decomposition temperature in close proximity of each other is used, the through-holes can be closed completely.

Example 2

Another embodiment of an apparatus for closing the opening of through-holes employable in practicing the method of the invention is described below.

Figure 5:
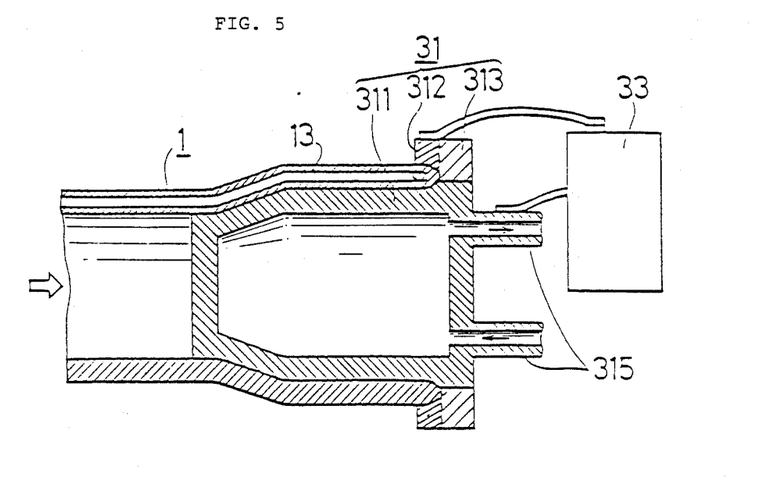

As shown by way of the example in FIG. 5, mold 311 for forming a sleeve-type socket is used as an inner mold. The mold 311 has a larger diameter than the inner diameter of the resin pipe 1. Accordingly, it is possible to close the opening of the through-holes 13 of the pipe 1 and concurrently to enlarge the diameter of the pipe end. Thus, the operating process can be considerably shortened and the production cost can be reduced. The inner mold 311 has fluid circulation tubes 315 for temperature regulation, whereby the temperature in the vicinity of the end portion 10 of the resin pipe 1 is suitably adjusted.

Example 3

Figure 6:
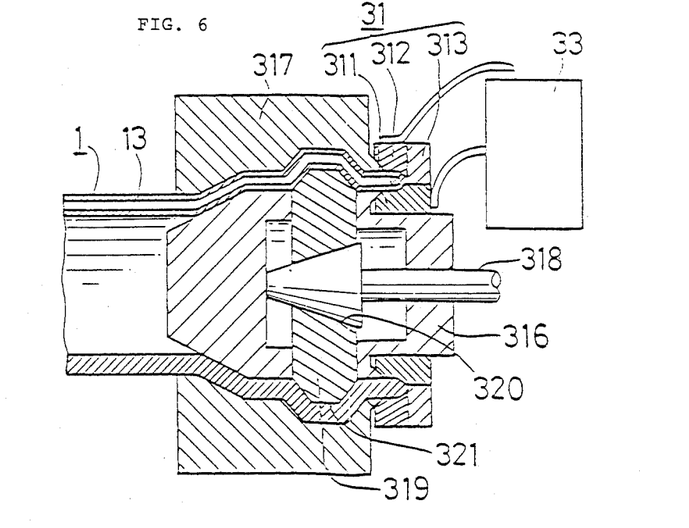

Another embodiment of an apparatus conducting the method of this invention, as illustrated in FIG. 6, comprises a mold 316 for forming a socket, disposed in front of the inner mold 311, and a split-type outer mold 317 for forming a socket, disposed in front of the outer mold 312. The inner mold 316 has a split mold 319 disposed centrally in the axial direction thereof, with a cone-shaped space 320 provided in the middle of the split mold 319 and extending in the axial direction. A conical rod 318 which is reciprocable in the axial direction of the inner mold 316 is in engagement with the space 320, so that the diameter of the split mold 319 can be increased or reduced by changing the position of the rod 318. Since such construction is known in the art, the detail thereof is not described here. On the basis of the same principle as that of the preceding example the process is conducted as follows: a resin pipe 1, one end portion of which is preheated, is inserted into the inner mold 316; the split mold 319 is diametrically enlarged by moving the rod 318; the outer periphery of the socket portion is peripherally clamped by the split-type outer mold 317; then a high-frequency current is applied to the inner and outer molds 311, 312 while the mold 31 is forced into contact with the tip 330 of the resin pipe 1, whereby a socket having an annular channel 321 for housing a seal member such as rubber packing, is formed simultaneously with the closing of the through-holes 13 of the resin pipe 1. The split-type outer mold 317 has the function of preventing the resin pipe 1 from buckling when the pipe 1 is forcedly inserted while it is melted by the high-frequency dielectric heating.

Example 4

Figure 7:
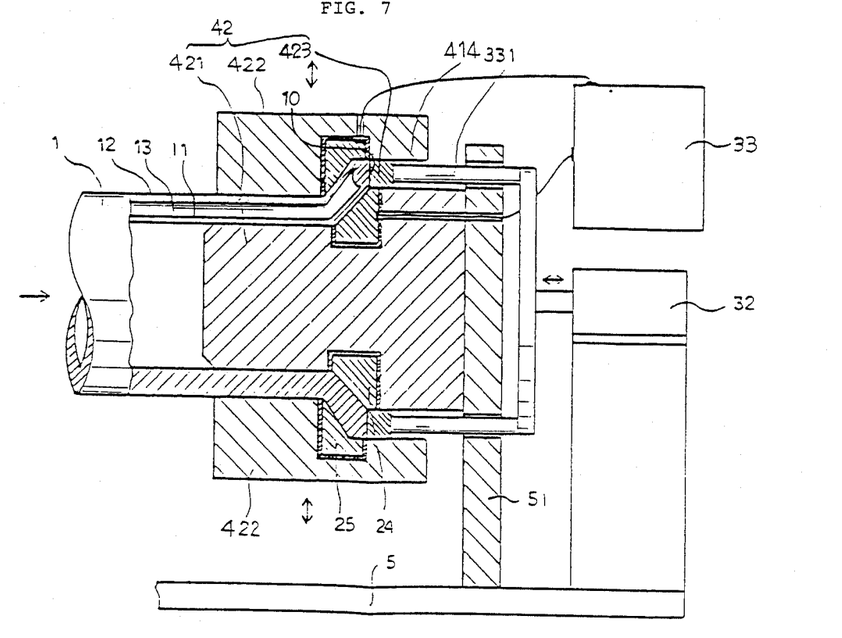
FIG. 7 is a front sectional view showing another example of such apparatus.

Another embodiment of an apparatus for closing the opening of through-holes, as FIG. 7 illustrates, is of such arrangement that the through-holes are closed while one end portion of the resin pipe 1 is diametrically enlarged. This apparatus includes a mold 42 for holding the pipe-wall portion of the resin pipe 1, between inner and outer molds 421, 422 of the mold 42, a pressing device 32 for pressing the end portion 10 of the resin pipe 1 in the axial direction of the pipe, and a high-frequency oscillator 33 connected to mold 42. Each of the inner mold 421 and an outer mold 422 has a radially sloped surface adapted to allow the end of the resin pipe 1 to be diametrically enlarged. The inner mold 421 is fixed to a stationary table 5 by a support member 51. As is the case with Example 1, the inner and outer molds 421, 422, at least with respect to their sloped surfaces 24 and 25 and adjacent portions, are made of a material having high electric conductivity, such as brass or copper. The molds 421, 422 are connected to the high-frequency oscillator 33. The mold 42 has a pressing ring 423 which is connected by an arm 331 to the pressing device 32, presses the pipe end portion 10 positioned in the housing space 414 defined by the inner and outer molds 421, 422, and closes the through-holes 13 formed in the pipe-wall.

Figure 8A:
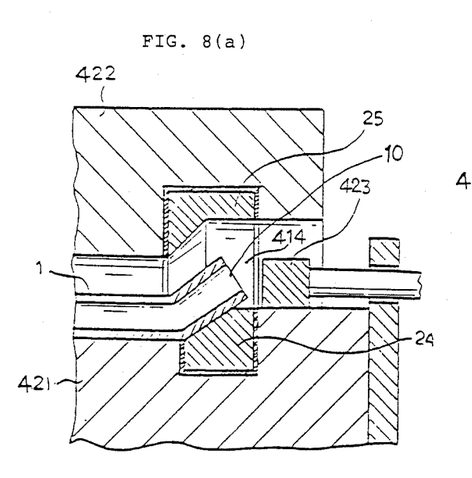
FIGS. 8(a) and 8(b) are explanatory views respectively showing one step of the method in which the apparatus of FIG. 7 is used.
Figure 8B:
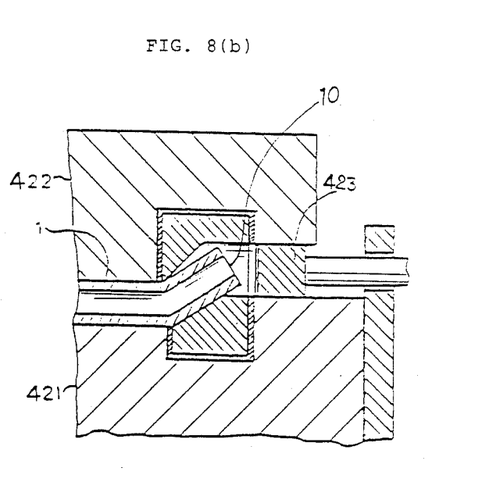

The method in accordance with this invention using the above described apparatus will be explained below. First, as illustrated in FIG. 8($a$), a resin pipe 1 made of rigid polyvinyl-chloride with its one end portion preheated and softened in a hot air oven is placed in the inner mold 421 and is diametrically enlarged. In this conjunction, the pipe end 10 is positioned in the space 414 for housing the pipe end portion. Then, as FIG. 8($b$) shows, the outer mold 422 is pressed against the inner mold 421 so that the resin pipe 1 is held between them. Subsequently, a high frequency current is applied to electrodes 24, 25 while the pressing ring 423 is pressed by the pressing device 32 against the end portion of the resin pipe 1. The frequency and field strength of and application time for the high frequency current may be suitably determined according to the material, configuration and size of the resin pipe 1, and the distance between the electrodes. In the case that the resin pipe is made of rigid polyvinyl chloride and has a wall thickness of about 10 mm, a high frequency current of 40 MHz may be applied at a power output of 3 kW for 5 to 30 sec. The pressing force given by the pressing ring 423 is more than 2 kg/cm², or preferably within the range of 2 to 6 kg/cm².

The pipe end portion 10 held between the inner and outer molds 421, 422 and diametrically enlarged is then pressed by a pressing ring 423 in such a way that the inner wall 11 is bent toward the outer wall 12, and simultaneously the end portion is heated and melted by applying high frequency current, thereby the end portions of the inner and outer walls 11, 12 are bonded together. Since the surfaces of inner and outer walls 11, 12 of the pipe 1 are in contact with the inner and outer molds 421, 422, respectively, the surfaces are not subject to melting. Only the inner surfaces of the through-holes and the hole-partition walls at the pipe end portion are melted and bonded, with the result that the through-holes are closed. In this conjunction, the molten resin fills in the through-holes as the molten resin is pushed under the pressing force; thus, the area of bondage is increased to enhance the closure strength of the through-holes.

In this example, electrodes 24, 25 are positioned in the inner and outer molds 421, 422 respectively. The electrode 24 may be disposed in the pressing ring 423.

Instead of the inner mold which is adapted to enlarge the diameter of the pipe end portion, an inner mold having a sloped and diameter-reducing portion may be employed. In this case, the resin pipe is forcedly inserted into the inner mold having such a diameter-reducing portion and pressed with the outer mold, whereby the end portion of the pipe can be diametrically reduced.

Example 5

Figure 9A:
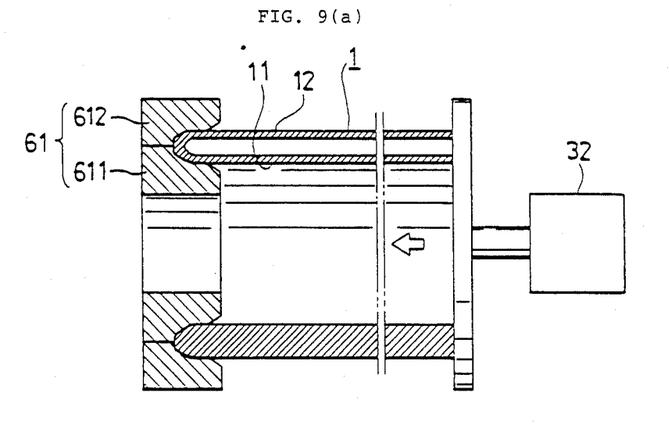
FIGS. 9(a) and 9(b) are explanatory views respectively illustrating one step of the method in which another apparatus is used.

Another method for closing the opening of through-holes will be explained below. One end portion of the resin pipe 1 (preferably a portion extending from the pipe end over a distance equivalent or similar to the thickness of the pipe) is heated and softened. The resin pipe 1, so heated, is inserted into a heating mold 61 in the same manner as illustrated in FIG. 9(a). The mold 61 comprises inner and outer molds 611, 612 which have radially sloped surfaces. The resin pipe 1 is pressed by a pressing device 32 against the innermost end of the mold and along the axis of the pipe, whereby the inner and outer pipe walls 11, 12 at the pipe end are brought closer to each other. The heating mold 61 may be heated so that the end portion of the resin pipe is maintained to be heated and softened. The heating temperature is selected according to the material and wall thickness of the resin pipe, and usually it is set at about 200° C.

Figure 9B:
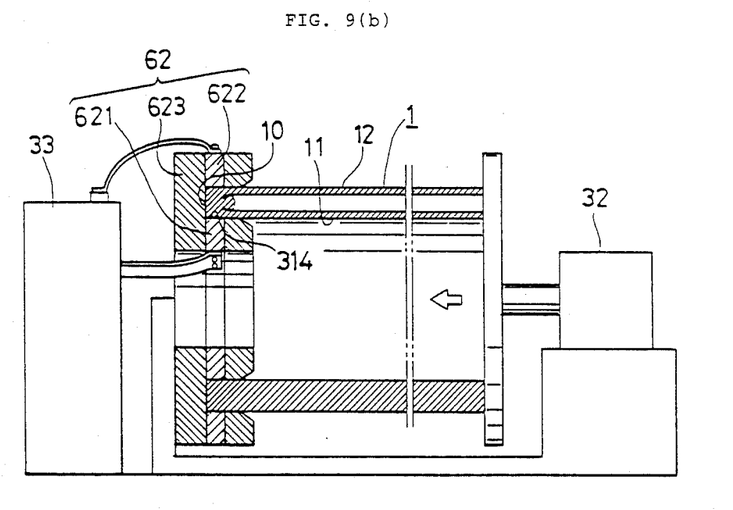

Then, as FIG. 9(b) illustrates, the resin pipe 1 is forcedly inserted into the mold 62 by the pressing device 32 in the axial direction of the pipe. As in Example 1, a high-frequency current is applied to the mold 62 by the high frequency oscillator 33. The pipe end which has been already heated and softened, as stated in the above explanation, is inserted into the mold 62 as it is pressed against the wall 623 of the mold 62, and is heated through high-frequency dielectric heating. Therefore, the inner and outer walls 11, 2 of the pipe end are bent inwardly or in the reverse direction to the pressing direction and melted. The inner mold 621 of the mold 62 is of a columnar shape and the outer mold 622 is of a cylindrical shape. Therefore, the innermost end space of the mold 62, unlike that in Example 1, is generally coextensive with the pipe end, and thus the pipe end is fused and bonded while retaining its wall thickness as it is. Thus, there is no likelihood that the once-closed through-holes will regain their open state upon such secondary processing as a diametrical expansion or upon an application of any impact. Thus, the closed pipe end has excellent strength characteristics.

In this example, the closing of the opening of through-holes, the diametrical enlargement of the pipe end, and the formation of a socket having an annular channel for receiving a seal member such as a rubber packing can be conducted concurrently, as in the examples shown in FIGS. 5 and 6.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for closing the opening of each of the through-holes formed in the pipe-wall of a resin pipe and which extend parallel to the axis of said pipe, are partitioned from each other by hole-partition walls and are open at one end, said pipe-wall including an inner wall portion and an outer wall portion, said method comprising the steps of:

heating and softening one end portion of said pipe, pressing said end portion in the direction parallel to said axis in a first mold in such a manner that said end portion is positioned between inner and outer molds of said first mold and that the tip of said end portion extends from said first mold toward a second mold, by a certain length said first mold including inner and outer molds disposed coaxially with said resin pipe for holding the inner and outer walls of the pipe therebetween and said second mold being connected to a high frequency current source, and said length of said tip area of said pipe being slightly greater than the depth of a cavity of said second mold into which said tip of said pipe enters, diametrically enlarging a portion of said inner mold and said pipe, clamping said pipe walls by the outer mold of said first mold, and heating aid end portion by applying a high frequency current to said second mold and forcing said second mold into contact with the end portion of said pipe while the high frequency current is being applied to said second mold so as to melt said hole-partition walls, thereby closing each of said open ends of said through-holes.

2. The method of claim 1 wherein said heating and softening step further comprises heating and softening a portion of said pipe adjacent to said end portion.

3. A method according to claim 1, wherein said inner and outer molds have radially sloped surfaces adapted to allow the end portion to be diametrically enlarged or reduced.

4. A method for closing the openings of through-holes formed in the pipe-wall of a hollow resin pipe, said through-holes extending parallel to the axis of said pipe and said pipe-wall including an outer cylindrical surface and an inner cylindrical surface, said method comprising the steps of:

heating and softening an end portion of said pipe, said end portion including said openings;

inserting said end portion into a first mold comprising an outer mold for surrounding part of said outer cylindrical surface of said pipe-wall and an inner mold which is received by said cylindrical inner surface of said pipe-wall;

clamping said end portion between said outer and inner molds so that a tip of said end portion extends a given length from said first mold;

heating said tip by bringing said tip into contact with a cavity in a second mold, said cavity having a depth less than the length of said tip, said heating of said tip comprising the steps of applying a high frequency current to said second mold and forcing said second mold into contact with said end portion of said pipe while said applied high frequency current is applied to said second mold, whereby said pipe-wall around said through-hole openings is melted, thereby closing each of said through-hole openings.

5. The method of claim 4 further comprising the steps of:

heating a section of said pipe and diametrically enlarging said pipe section by diametrically enlarging a section of said inner mold.

* * * * *